March 5, 1963 G. A. NICKSTADT 3,079,814
SELF REGULATING GEAR REDUCTION MECHANISM
Filed Dec. 29, 1960 3 Sheets-Sheet 1
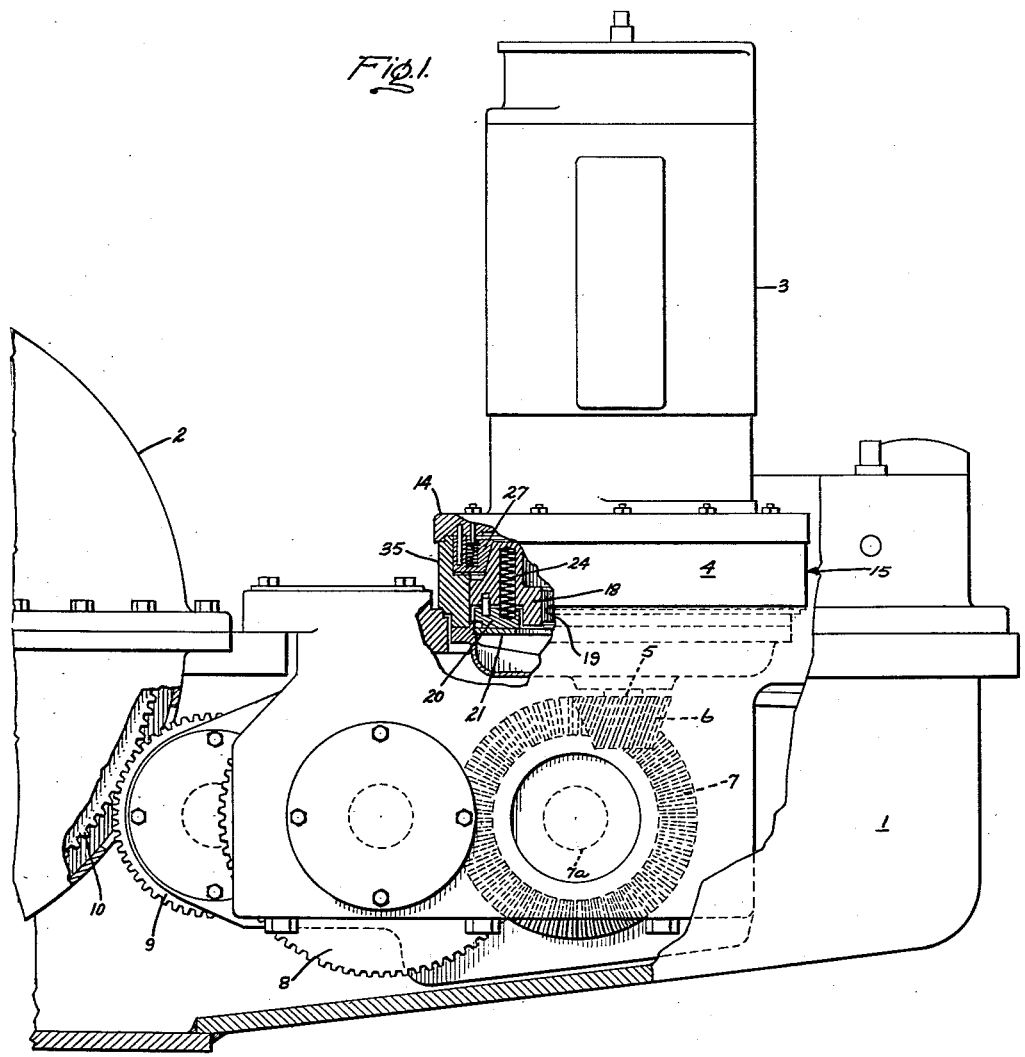
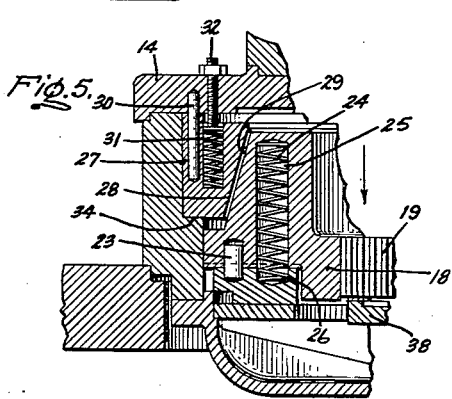
Inventor:
Gerhard A. Nickstadt,
by H. F. Manbeck, Jr.
Attorney.

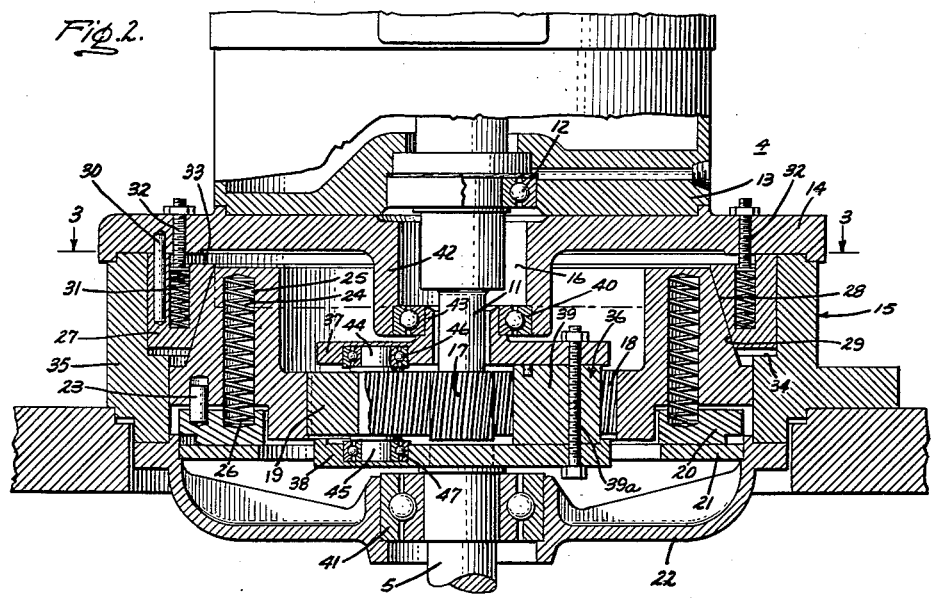
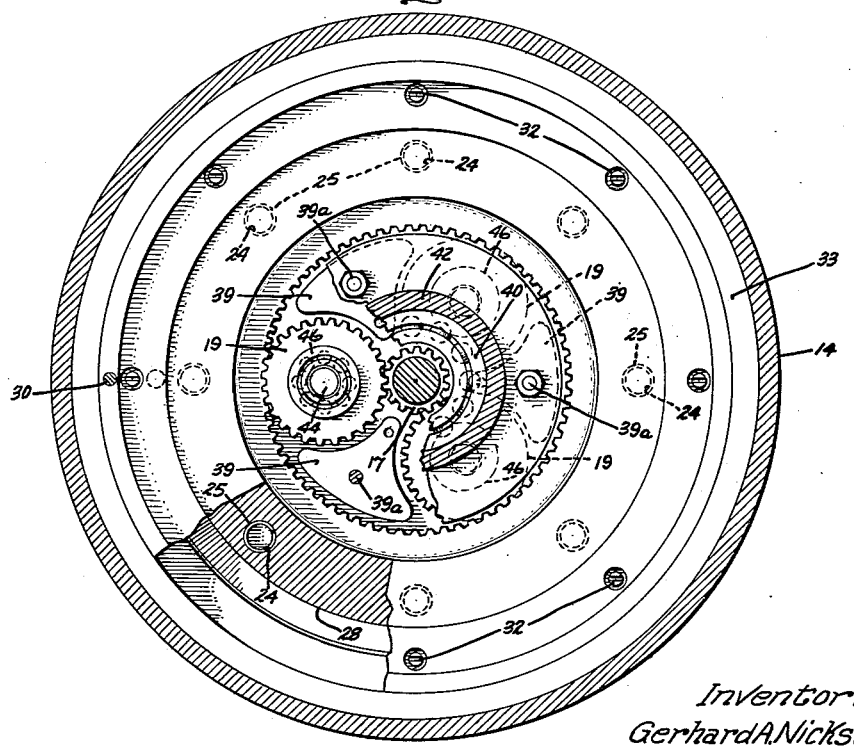

March 5, 1963 G. A. NICKSTADT 3,079,814
SELF REGULATING GEAR REDUCTION MECHANISM
Filed Dec. 29, 1960 3 Sheets-Sheet 3

Inventor:
Gerhard A. Nickstadt,
by H. F. Maubeck, Jr.
Attorney.

United States Patent Office 3,079,814
Patented Mar. 5, 1963

3,079,814
SELF REGULATING GEAR REDUCTION
MECHANISM
Gerhard A. Nickstadt, Oakland, N.J., assignor to General
Electric Company, a corporation of New York
Filed Dec. 29, 1960, Ser. No. 79,372
3 Claims. (Cl. 74—785)

My invention relates to gear reduction mechanisms and more particularly to such a mechanism which is self-regulating to limit its output torque to a predetermined value.

In one preferred form, my invention finds particular utility as an auxiliary turning gear for use with large steam turbines. To avoid internal damage to large turbines, it is customary and in fact necessary that they be turned slowly by an auxiliary power source before being put into service and also when first taken out of service. As the turbine is turned or rotated slowly before going into service, a small amount of steam is bled through it so that it warms up gradually towards its operating temperature. On the other hand, when the turbine is taken out of service, it cools down gradually as it is rotated by the auxiliary power source. Depending upon the size of the turbine, the warming and cooling periods may last as long as a day and during the whole time the turbine must be turned or rotated continuously. If it is not so rotated, serious damage may occur, as for example, sagging of the rotor shaft due to uneven cooling of the rotor permitting rubbing on the stationary parts.

Customarily, an electric motor is used to turn the turbine during these periods, the motor being connected to the turbine through suitable reduction gearing. To avoid damage to the turbine, it is desirable that a torque limiting device be included in the driving connection. A very high but temporary torque demand may occur for a number of reasons, for example, because of the high inertia of the turbine, because of static friction in the journals or because of drag caused by a temporarily deformed part of the turbine casing; and if damage is to be avoided, some means should be provided to limit the output torque of the turning gear.

A conventional cone type friction clutch can be used as the protective or torque limiting device. But it is not wholly satisfactory for this type of service. In a friction clutch, the slip point is determined by the transmitted torque, the spring loading of the clutch and the static friction factor. If the torque rises to a value such that the clutch slips, the static friction factor becomes a sliding friction factor which is only about one-fifth of the static friction factor, and the clutch does not become effective to transmit torque again unless the torque requirements decrease to approximately one-fifth of the original slip moment. With this wide differential between the slip and reengagement torques, the clutch may very well continue to slip after the temporary over-load is relieved. Not only will this cause wear within the clutch but it will necessitate repeated reengagement of the clutch to bring the turbine up to turning gear speed. Thus, some attention by the operator will be required during the initial turning period which might not otherwise be required.

Accordingly, it is an object of my invention to provide a turbine turning gear which is safely limited as to its transmitted torque but does not have these disadvantages; and more generally, it is an object of my invention to provide a self-regulating gear reduction mechanism which is effective to limit its transmitted torque to a predetermined level while providing an immediate resumption of the drive once the torque demand drops below that level.

Another object of my invention is to provide a self-regulating gear reduction mechanism in which the drive is automatically interrupted at a critical torque level by a physical separation of the parts and then is automatically resumed by a reengagement of the parts when the torque drops below the critical level.

In carrying out my invention on one form thereof, I provide a self-regulating gear mechanism comprising an input shaft and gear, an internal gear ring, and a planet gear which is arranged for planetary movement between the input gear and the ring gear. The ring gear is mounted for both rotation and limited axial movement, but is normally held stationary by engagement with a nonrotatable brake member. The ring gear and brake member are spring biased toward each other and have mating clutch surfaces, and so long as the ring gear is held stationary by the brake member, the mechanism functions as a conventional planetary gear train imparting motion to an output shaft. However, if the ring gear is released for rotation, the output shaft ceases to turn and instead the ring gear is driven by the motion of the input gear.

The self-limiting action of the gear mechanism is obtained by automatically releasing the ring gear for rotation at the maximum allowable torque, and then automatically restraining it from rotation once the torque demand drops below that value. The automatic release and reengagement is controlled by the forces set up in the gears themselves, the gears being provided with helical teeth for that purpose. Because of the helical teeth, an axial force is developed in the ring gear during the normal operation of the gear mechanism, which is in opposition to the spring force biasing the gear against the brake member. This axial force is directly proportional to the torque being transmitted through the gear mechanism, and at the maximum allowable torque it overcomes the biasing force and causes the ring gear to move axially away from the brake member. The ring gear then rotates and the drive to the output member is interrupted. As the output torque goes to zero, the biasing springs reengage the ring gear with the brake member and the planet gear resumes its planetary movement, with the output member being again driven therefrom. Thus, the gear mechanism is self-regulating to limit the transmitted torque to a predetermined safe value, with both the interruption and resumption of the drive occurring at generally the same torque level.

The subject matter which I regard as my invention is particularly pointed out and distinctly claimed in the concluding portion of this specification. My invention, however, both as to organization and method of operation together with further objects and advantages thereof, may be best understood by reference to the following description taken into conjunction with the accompanying drawings in which:

FIG. 1 is an elevational view, partially in section, of a turbine turning gear incorporating my new and improved self-regulating mechanism in one form thereof;

FIG. 2 is an elevational view, in section, of the self-regulating gear mechanism;

FIG. 3 is a horizontal sectional view taken along the line 3—3 of FIG. 2;

FIG. 5 is a fragmentary view illustrating the ring gear of the mechanism in its displaced or torque limiting position relative to the associated brake member.

Figure 4:
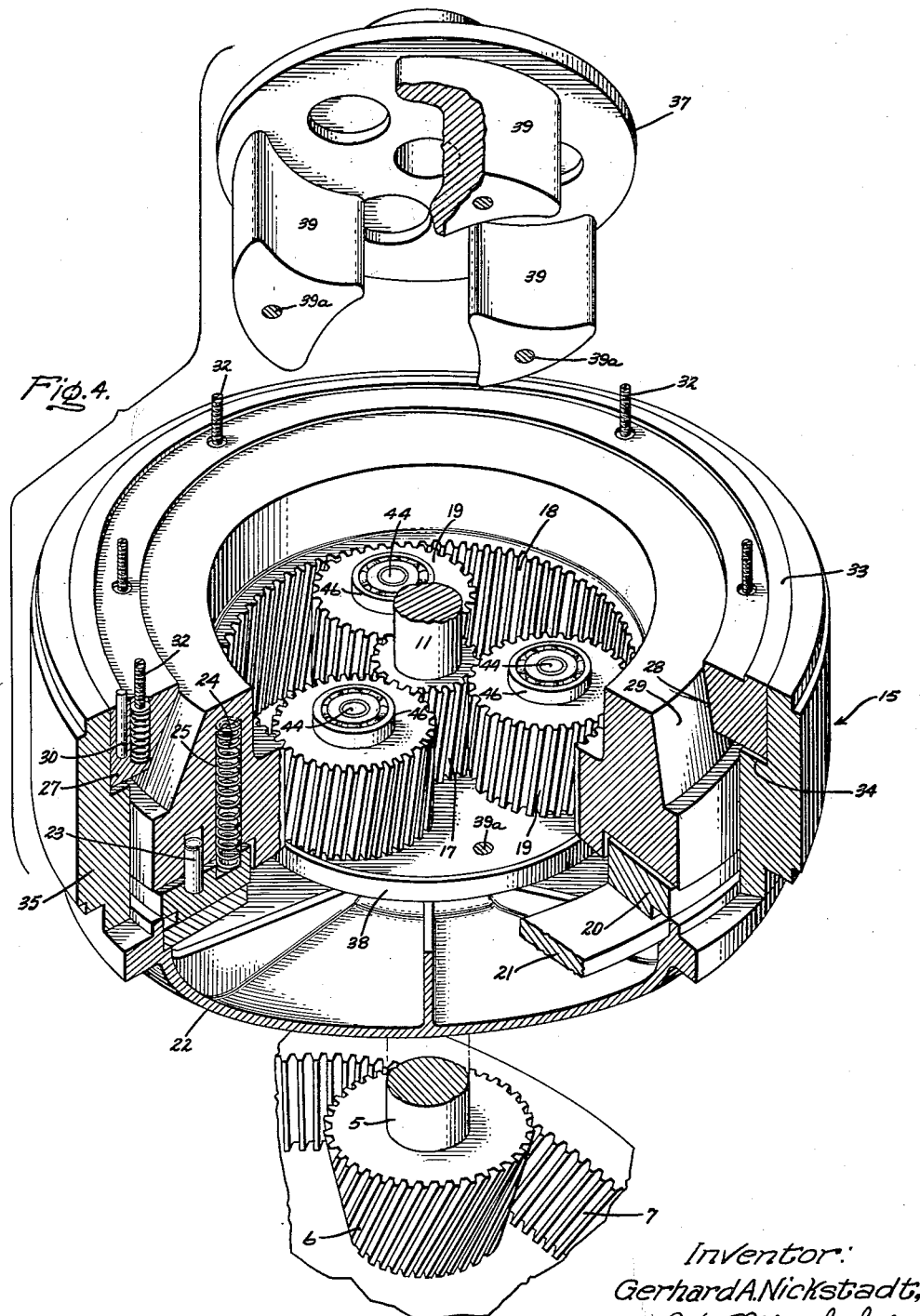
FIG. 4 is an exploded view of the self-regulating gear mechanism.

Referring now to FIG. 1, I have shown therein a turbine turning gear 1 which is arranged to turn or rotate a steam turbine 2 at a slow speed before the turbine is placed in service and after it is removed from service. The turning gear is driven by an electric motor 3 and includes a self-regulating gear mechanism generally indicated at 4 which is effective to limit the transmitted torque automatically to a safe predetermined upper limit. The gear mechanism 4 forms an important aspect of my invention and will be described in detail hereinafter. The gear mechanism 4 is driven directly from the motor 3 and mounted on its output shaft 5 is the pinion 6 of a bevel gear set. As shown, the pinion 6 drives a face gear 7, and the gear 7 in turn drives the input shaft 7a for additional reduction gearing such as indicated at 8. The gear train driven from the motor 3 and the gear reduction mechanism 4, culminates in the clash pionion 9 which mates with the bull gear 10 within the turbine so as to rotate the turbine slowly. Thus, the turning gear 1 provides a means for turning the turbine 2 slowly before it is put in service and when it is first taken out of service, and as will be more fully explained hereinafter, the gear mechanism 4 included in the gear train is effective to limit the transmitted torque to a safe predetermined limit.

Before referring in detail to the gear mechanism 4, it will be noted that it would be very disadvantageous if the turning gear 1 were driven from the turbine after the turbine was placed in service. Due to the very high speed involved, the turning gear cannot remain connected to the turbine during its operation. Therefore, the clash pinion 9 is customarily arranged so that it automatically disengages from the bull gear 10 when the turbine comes into service. Since the arrangement to provide this automatic disengagement forms no part of the present invention, it will not be described in detail herein. However, one well-known way of providing this feature is to mount the clash pinion on a yoke which pivots on a pair of bearings. As the turbine goes into service and the bull gear tends to drive the clash pinion, the reverse torque causes the yoke and pinion to pivot and thereby disengages the clash pinion from the bull gear. It will be understood, however, that any suitable means may be used to provide this disengagement.

Referring now to FIGS. 2–4, I have shown therein one preferred embodiment of my new and improved self-regulating gear mechanism. Although depending on the application the mechanism 4 could be driven by any suitable input shaft, in the illustrated embodiment it is driven by the shaft 11 of the motor 3. As shown, the shaft 11 extends vertically and it is journaled above the mechanism 4 by means of a ball bearing assembly 12 mounted in the lower end bell 13 of the motor. The end bell 13 and thus the entire motor is supported by the top plate or cover 14 of the mechanism housing 15 and the shaft 11 extends downwardly into the housing 15 through a flanged aperture 16 formed in the cover. At its lower end, the shaft 11 has formed thereon the input gear 17 of the mechanism 4. The input gear 17 is disposed within a generally stationary internal ring gear 18 and mounted between the gears 17 and 18 are three planetary gears 19. All of the gears 17, 18 and 19 are provided with helical teeth for reasons which will become more apparent hereinafter.

To provide for limiting the transmitted torque to a safe predetermined value, the ring gear 18, although normally stationary, is mounted for both rotational and limited axial movement. As best shown in FIGS. 2 and 4, the outer section of the gear 18 is disposed over a supporting ring 20 which in turn is carried by a stationary mounting surface 21. The surface 21, as shown, comprises part of the lower end bell 22. The ring gear 18 is pinned to the supporting ring or plate 20 by one or more pins 23 so that it may have limited axial movement with regard to the supporting plate but yet cannot rotate relative to it. Rather, if there is a moment tending to cause rotation of the ring gear 18, it and the plate 20 will move together with the plate sliding on the large bearing surface provided at 21.

To prevent rotation of the ring gear 18 during the normal operation of the gear mechanism, it is biased upwardly by means of a plurality of springs 24 disposed between it and the supporting plate 20. In the illustrated embodiment recesses 25 and 26 are formed respectively in the ring gear and the mounting plate to accommodate the coil springs 24, but it will be understood that they may be held between the members in any suitable fashion. The springs 24 bias the ring gear 18 upwardly away from the rotatable supporting plate 20 toward a stationary clutch or brake member 27 which is disposed above the outer portion of the ring gear. The brake member 27, which is in the form of an annulus, and the gear 18 have tapered mating clutch surfaces 28 and 29 and the springs 24 bias the gear 18 so that these surfaces are normally held in engagement. In the illustrated embodiment, these clutch surfaces are formed by suitably machining the brake member 27 and the ring gear 18, but it will be understood that the clutch surfaces may also consist of friction lining material suitably fastened to the brake and ring respectively.

The brake member 27 is movable axially within the housing 15 but is restrained from rotation by one or more pins 30 which extend between it and the stationary cover member 14. The brake member may move up and down axially on the pins 30 and it is biased downwardly toward the ring gear 18 by a plurality of biasing springs 31. In the illustrated embodiment, the springs 31 are fitted within suitable recesses in the brake member and the amount of force they apply to the brake member may be adjusted by means of adjusting screws 32 positioned behind the springs. The brake member 27 is movable axially so that the slip torque setting of the clutch or brake may be readily varied. If the main biasing springs 24 could be adjusted, the upper springs 31 could be omitted and the brake member 27 could be fastened directly to the stationary housing 15. Since, in the illustrated embodiment, the springs 24 cannot be adjusted, the upper springs 31 are provided for adjustment purposes. The adjustment of springs 31 by the screws 32 moves the brake member 27 and the ring gear 18 compressing or releasing springs 24 and thereby varies the slip torque setting. It will be noted that the travel of the brake member 27 in the upward direction is limited by the mechanism cover 14, it acting as a stop engaging an outer flange 33 on the brake member. The travel of the brake member is also limited in the downward direction. In this case, a flange 34 formed on the inner surface of the side or shell member 35 of the housing 15 engages the bottom of the brake member to limit its movement.

With this arrangement of the brake member and the ring gear, the ring gear is normally held stationary by the contact between the inclined or tapered brake or clutch surfaces 28—29. It will be seen, however, that if the ring gear is moved downwardly toward the supporting ring 20, it can separate from the brake member and thereby be released from rotation. With the downward movement of the brake member being limited by the flange 34, it cannot follow the ring gear to the limit of its travel and thus the clutch surface 29 on the ring gear can disengage from the mating surface 28 on the brake member and free the ring gear for rotation. As will be described hereinafter, this action is used to limit the output torque of the gear mechanism to a predetermined safe value.

As was mentioned above, the ring gear 18 is positioned around the input gear 17 with the planetary gears 19 positioned between them. As is best shown in FIG. 2, the planet gears 19 are carried by a rotatable output member or carrier 36. The carrier 36 is journaled coaxially with the input shaft 11 and it includes a top plate 37, a bottom plate 38 and connecting posts 39 (FIG. 4) with bolts 39a extending through the posts to hold the assembly together. The carrier is journaled in upper and lower ball bearing assemblies 40 and 41. The upper bearing assembly 40 is held by a flange 42 on the stationary cover 14 while the bottom assembly 41 is supported by means of the lower end bell 22. The output shaft 5 of the mechanism is connected directly to the bottom plate 38 of the carrier and in fact it is the shaft 5 which is journaled within the assembly 41. At the upper end of the carrier, a hollow stub shaft 43 is formed to act as the journal and it will be seen from FIG. 2 that the input shaft 11 extends downwardly through the stub shaft 43.

The planetary gears 19 are mounted by the upper and lower plates 37 and 38 of the carrier between the posts or side wall supports 39 of the carrier. Specifically, each of the gears 19 is provided with upper and lower stub shafts 44 and 45 and these shafts are journaled in the upper and lower plates of the carrier by ball bearing assemblies 46 and 47. With this arrangement, the gears 19 may rotate with respect to the carrier, but yet as they move in a planetary path between the input gear 17 and the ring gear 18, they will rotate the carrier so as to turn the output shaft 5.

During the normal operation of the self-regulating gear mechanism, the drive is from the motor shaft 11 to the input pinion or gear 17. The gear 17 drives the planet gears 19 and so long as the outer ring gear 18 remains stationary, the gears 19 are driven with a planetary movement around the input gear. In other words, they move in an orbital path around the gear 17 while at the same time rotating on their own axes. With this movement, they turn the carrier 36 to rotate the output shaft 5 and the gear train connected thereto.

So long as the torque demand from the gear mechanism does not exceed a predetermined limit, the drive will continue from the input shaft 11 to the output shaft 5 through the planetary gear action. However, if the torque should rise beyond this predetermined limit, the mechanism is then self-regulating to interrupt the drive and thereby limit the output torque. This, of course, prevents damage to the gear train itself and to the driven apparatus such as the turbine 2. As will now be explained, this torque limiting action is automatically accomplished through the forces set up in the gear mechanism itself.

It will be remembered that each of the gears 17, 18 and 19 is provided with helical teeth. As a result of these teeth, axial forces are created on the various gears during their rotation. The input gear 17 and the planet gears 19 are axially fixed and thus cannot move as a result of these forces. The ring gear 18 can, however, move axially on the pins 23 and the axial force created by the contact between its teeth and those of the planet gears is such as to create a force opposing that of the biasing springs 24. In other words, the tooth force is in a direction to move the ring gear 18 downwardly away from the brake member 27. The tooth force is proportional to the torque being transmitted through the gear mechanism to that as the torque demand increases the downward axial force on the ring gear 18 also increases. At a predetermined level determined by the strength of the biasing springs the ring gear is moved downwardly so as to separate from the brake member 27. When this happens there is no longer any restraining action holding the ring gear stationary and thereby it may rotate together with the supporting plate 20 against the stationary mounting surface 21. This axial position of the ring gear when it is disengaged from the clutch member for rotation is illustrated in FIG. 5. The springs 31, of course, bias the brake member downwardly so that it initially travels downwardly with the ring gear as the ring gear moved from its normal position. But it will be noted that flange 34 on the housing limits the downward travel of the brake member 27 to insure the disengagement of the ring gear from the brake member.

With the ring gear freed for rotation, it is then turned by the planet gears 19 relative to the housing and as a result the planet gears themselves stop moving in an orbital path. Rather, they merely rotate on their axes driving the ring gear and thereby cease to turn the carrier 36 and the output shaft. Thus, except as inertia may continue to turn the carrier and the driven shaft, the drive through the gear mechanism is interrupted. Thereby, the transmitted torque cannot rise above the predetermined maximum value and damage to the motor, the gear mechanism and the load is prevented.

The movement of the ring gear which provides the torque limiting action, of course, relieves the axial thrust on the ring gear itself. Thus, the springs 24 try to return the ring gear to its normal position in contact with the brake member 27. In other words, when the torque demand rises above the predetermined clutch setting, the ring gear will momentarily disengage from the brake member, but as soon as it does, the helical gear thrust goes to zero and reengagement occurs under the spring force. When the brake surfaces 28—29 again make contact, friction is established between the ring gear and the brake member and the ring gear is brought to a halt. The force of the biasing springs 24 and 31 is heavy enough so that the ring gear is readily brought to a stop even though the lower friction value present during sliding is involved. With the ring gear brought to a stop, the planet gears 19 again resume their orbital movement and the carrier 36 and the output shaft are again driven. This, of course, assumes that the torque demand has decreased enough that it is below the maximum limit. However, if the demand should still be above the acceptable limit, the ring gear would again disengage from the brake 27 thereby limiting the output torque. Thus, it will be seen that the gear mechanism 4 operates automatically to limit the maximum torque with the reengagement torque being generally the same as or very close to the disengagement torque.

The mechanism 4 is of particular utility in applications such as a turbine turning gear where there may be very high, but temporary torque demands against which it is thus desired to protect. In these applications, the gear mechanism 4 will automatically limit the transmitted torque to a predetermined safe maximum value and will automatically reengage once the torque drops below that value. Both the disengaging and the reengaging actions are accomplished by means of the axial forces created by the helical gears and thus are entirely automatic with no attention by an operator being needed.

Moreover, since the spring force on the ring gear is high enough to permit reengagement even under conditions of sliding friction, the reengagement torque is generally of the same magnitude as the disengagement torque so that there is no prolonged slippage within the mechanism or interruption of the drive once the torque demand has dropped below the critical level.

While in accordance with the patent statutes I have described at present what is considered to be a preferred embodiment of my invention, it will be obvious to those skilled in the art that various changes and modifications may be made therein without departing from the invention, and it is therefore aimed in the appended claims to cover all such equivalent variations as come within the true spirit and scope of the invention.

What I claim as new and desire to secure by Letters Patent of the United States is:

1. A gear reduction mechanism which is self-regulating to limit its output torque to a predetermined value, comprising an input gear, a ring gear disposed around said input gear and mounted for both rotation and limited axial movement, at least one planet gear engaging said input gear and said ring gear, a rotatable carrier mounting said planet gear for planetary movement between said ring gear and said input gear, all of said gears having helical teeth and said ring gear having a clutch surface formed thereon, a non-rotatable brake member mounted adjacent said ring gear and having a clutch surface arranged for engagement with the clutch surface of said ring gear, a rotatable support plate positioned adjacent said ring gear for supporting said ring gear, a stationary mounting surface located adjacent said support plate for said ring gear and bearing said plate, spring means disposed between said support plate and said ring gear for biasing said ring gear towards said brake member thereby normally to hold said clutch surfaces in engagement and restrain said ring gear from rotation, an output member connected to said carrier and driven thereby at a speed slower than said input gear during the planetary movement of said planet gear, and means comprising said helical teeth of said output gear and said ring gear for producing an axial force on said ring gear opposing said spring means and tending to separate said clutch surfaces thereby to release said ring gear for rotation at a predetermined value of the output torque and interrupt the planetary motion of said planet gear, said spring means returning said ring gear to engagement with said brake member upon the decrease of the output torque below said predetermined value thereby to cause said planet gear to resume the drive of said carrier and said output member.

2. A gear reduction mechanism which is self-regulating to limit its output torque to a predetermined value, comprising an input gear, a ring gear disposed around said input gear and mounted for both rotation and limited axial movement, at least one planet gear engaging both said input gear and said ring gear, said planet gear being mounted for planetary movement between said ring gear and said input gear, all of said gears having helical teeth, a non-rotatable brake member mounted adjacent said ring gear and arranged for engagement with said ring gear, said brake member having limited axial movement relative to said ring gear, first spring means biasing said ring gear toward said brake member and second spring means biasing said brake member toward said ring gear whereby said brake member normally restrains said ring gear from rotation, means for adjusting the force of said second spring means on said brake member, and a rotatable output member driven from said planet gear so long as said ring gear remains stationary to cause planetary movement of said planet gear, said helical teeth of said planet gear and said ring gear being arranged to produce an axial force on said ring gear opposing said first spring means and tending to separate said ring gear from said brake member thereby to release said ring gear for rotation at a predetermined value of the output torque transmitted by said output member and so limit the said torque to that value, said first spring means returning said ring gear to engagement with said brake member upon the decrease of said output torque below said predetermined value thereby to cause said planet gear to resume the drive of said output member.

3. A gear reduction mechanism which is self-regulating to limit its output torque to a predetermined value, comprising an input sun gear, a ring gear disposed around said input gear and at least one planet gear engaging both said gear and said ring gear, a housing surrounding said gears, means mounting said ring gear for both rotation and limited axial movement including a rotatable support plate carried by said housing below said ring gear and pin means connecting said ring gear and said support plate, said planet gear being mounted for planetary movement between said ring gear and said input gear and being restrained from axial movement, all of said gears having helical teeth, a nonrotatable brake member mounted adjacent said ring gear and arranged for engagement with said ring gear, said brake member having limited axial movement relative to said ring gear, first coil spring means disposed between said support plate and said ring member for biasing said ring gear toward said brake member and second coil spring means disposed between said housing and said brake member for biasing said brake member toward said ring gear, whereby said brake member normally restrains said ring gear from rotation, a rotatable output member driven from said planet gear so long as said ring gear remains stationary to cause planetary movement of said planet gear, said helical teeth of said planet gear and said ring gear being arranged to produce an axial force on said ring gear opposing said first spring means and tending to separate said ring gear from said brake member, thereby to release said ring gear for rotation at a predetermined value of the output torque transmitted by said output member and so limit said torque to that value, said first spring means returning said ring gear to engagement with said brake member upon the decrease of the output torque below said predetermined value thereby to cause said planet gear to resume the drive of said output member, and means for adjusting the force of second spring means on said brake member to vary said predetermined value of the output torque.

References Cited in the file of this patent

UNITED STATES PATENTS

| | | |
|---|---|---|
| 1,463,447 | Stahl | July 31, 1923 |
| 1,644,065 | Lanquetin | Oct. 4, 1927 |
| 2,003,795 | Wilsing | June 4, 1935 |
| 2,259,437 | Dean | Oct. 21, 1941 |
| 2,268,578 | Eason | Jan. 6, 1942 |
| 2,271,640 | Heintz | Feb. 3, 1942 |
| 2,403,094 | Lear | July 2, 1946 |
| 2,417,732 | Bland et al. | Mar. 18, 1947 |
| 2,517,776 | Feierabend | Aug. 8, 1950 |
| 2,693,322 | Mercier | Nov. 2, 1954 |
| 2,792,722 | Stefan | May 21, 1957 |
| 2,863,335 | Miller | Dec. 9, 1958 |
| 2,871,725 | Teramala | Feb. 3, 1959 |
| 2,884,814 | Schott | May 5, 1959 |